Aug. 16, 1932.                    R. MARSH                    1,872,153
                          AUTOMOBILE SIGNAL SWITCH
                          Filed June 4, 1929          2 Sheets-Sheet 1
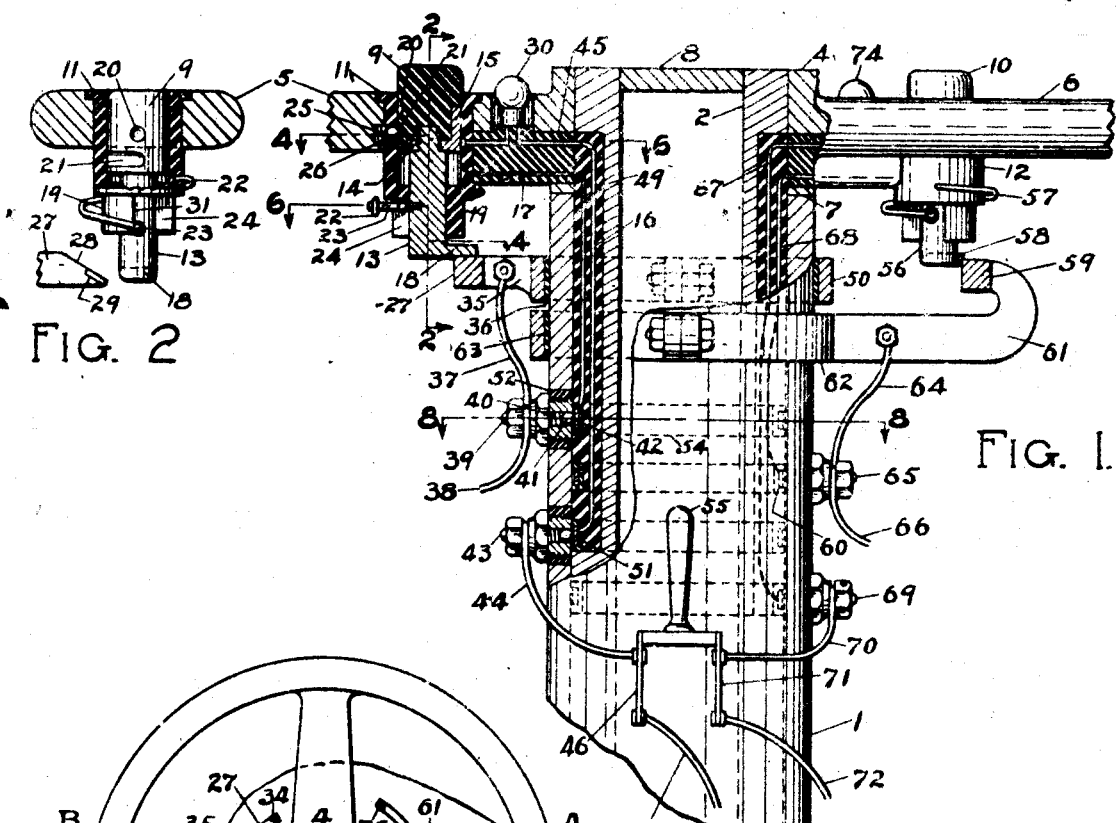
WITNESSES                                           INVENTOR
                                                   Robert Marsh.
                              BY
                                                   ATTORNEY.

Aug. 16, 1932.  R. MARSH  1,872,153
AUTOMOBILE SIGNAL SWITCH
Filed June 4, 1929   2 Sheets-Sheet 2

WITNESSES
Charles B. Moulton
Elsie P. Cinford

INVENTOR
Robert Marsh
BY
Lucian Jackson
ATTORNEY.

Patented Aug. 16, 1932

1,872,153

UNITED STATES PATENT OFFICE

ROBERT MARSH, OF BUFFALO, NEW YORK

AUTOMOBILE SIGNAL SWITCH

Application filed June 4, 1929. Serial No. 368,329.

My invention relates to signal means for vehicles and has reference more particularly to an electric signal to be used on automobiles for indicating a right or left turn and so eliminating the inconvenience of using the hand when in a closed car and the ineffectiveness of the hand signal at night.

The primary object of my invention is to provide a device of the character described with which a motor vehicle may be equipped and which can be conveniently and manually manipulated to indicate the drivers intention to make a turn a sufficient distance before such turn is to be made to properly warn a following vehicle.

Another object of my invention is to provide a signaling device which will in addition to the manually operated portion thereof also furnish a means for automatically signaling a turn after said turn is started, irrespective of the manually operated portion.

Another object of my invention is to provide a signaling device which will automatically throw off both the manually and automatically operated portions of said signal.

With the foregoing and other objects in view which will appear as the description proceeds, the invention consists in certain features of novelty in the construction, combination and arrangement of parts by which the said objects are attained, the invention being more particularly pointed out in the claims.

It is understood that various changes may be made in the construction and arrangement of parts without departing from the spirit or sacrificing any of the advantages of the invention as set forth in the appended claims.

Referring to the drawings accompanying and forming a part of this specification, wherein like symbols refer to like or corresponding parts throughout the several views and in which the preferred embodiment of my invention is illustrated with rear indicator parts in conjunction with the ordinary stop and tail lights.

Figure 1 is a vertical elevation of a portion of an automobile steering column and wheel, partly in section and showing the actuating or manipulating means of my signal device partly in section and attached thereto. The steering wheel in Fig. 1 is shown turned one-half around from the position shown in Fig. 3 and in the direction of arrow A as in making a right turn.

Fig. 2 is a vertical elevation, partly in section, on the line 2—2 of Fig. 1, of one of the push buttons or switches of my signal.

Fig. 3 is a plan of an automobile steering wheel with my signal attached thereto and also an elevation of a rear indicator together with a diagrammatic wiring connection between said wheel and said rear indicator. The position of the steering wheel in Fig. 3 is such that the automobile will move forward in a straight line.

Figure 5:
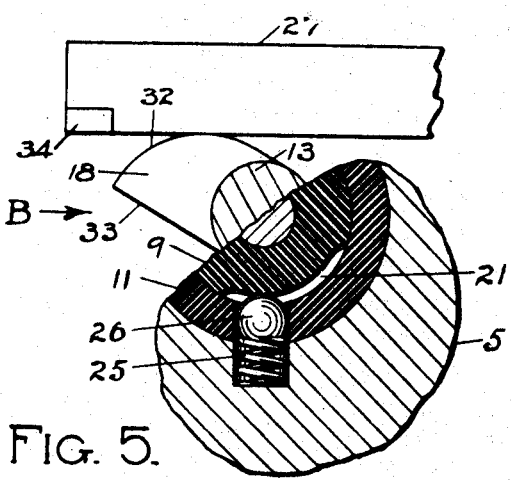
Fig. 5 is the same sectional view as Fig. 4 and with the push button turned in the position assumed when said push button is contacting with its sector and the steering wheel is moved in the direction of arrow B.

In the figures, 1 is an automobile steering column in the shape of a tube and forms a stationary housing to support the steering wheel and movable connections attached thereto used in guiding an automobile. 2 is a tube rotatably mounted inside of column 1 and to which is fastened a steering wheel 3 having a hub 4 and two of the arms numbered 5 and 6. The hub 4 of said steering wheel 3 rests on and bears against the top of the column 1 on the line 7. The end of tube 2 is closed at the top by a plug 8.

Figure 6:
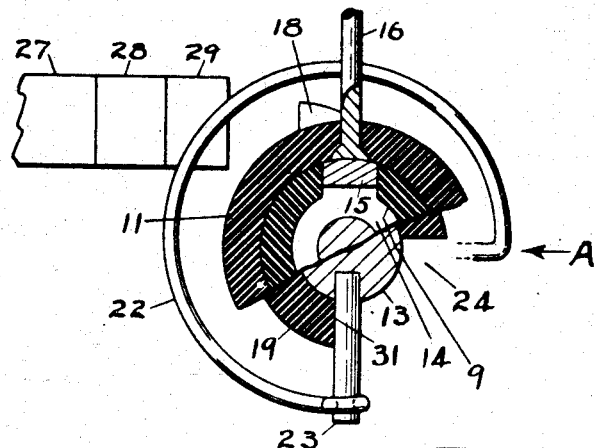
Fig. 6 is a sectional plan view of the push button shown in Fig. 4 but on line 6—6 of Fig. 1.
Figure 8:
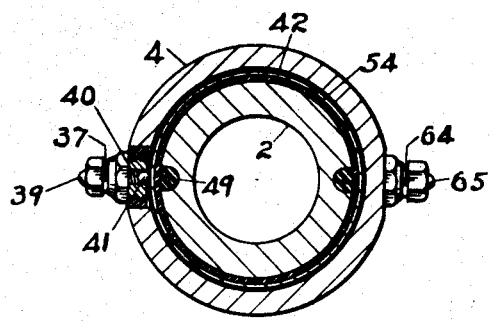
Fig. 8 is a section of the steering column on line 8—8 of Fig. 1.

11 is a piece of insulation shaped like a cup and fastened through the arm 5 of the steering wheel 3 to hold the push button 9. Push button 9 is cylindrical in shape, composed of insulating material and having a cylindrical stem 13 of metal or conducting material which is screwed into said button at the bottom and through a metal plate 14. Plate 14 is countersunk into and fastened to said button 9. 15 is a narrow strip of metal in the side of push button 9 and connected with the bottom plate 14 for the purpose of connecting wires 16 and 17 when said button 9 is pushed down into the cup 11 (Fig. 6). The ends of wires 16 and 17 are enlarged as shown in Fig. 1 and extend into said cup 11 enough to make good contact with the strip 15.

20 and 21 are depressions in the side of push button 9 to yieldingly hold said button in its lower position as shown in Fig. 2 or its upper position as shown in Fig. 1 by means of ball 26 and spring 25. The push button 9 having a partial rotary as well as a vertical movement the spherical sided depression 21 is extended into a slot approximately one-quarter around said button 9 as shown in Fig. 2 for the purpose of yieldingly holding it when the ball 26 is in said slot 21. Depression 20 is spherical in shape as shown in Figs. 1 and 2.

Figure 4:
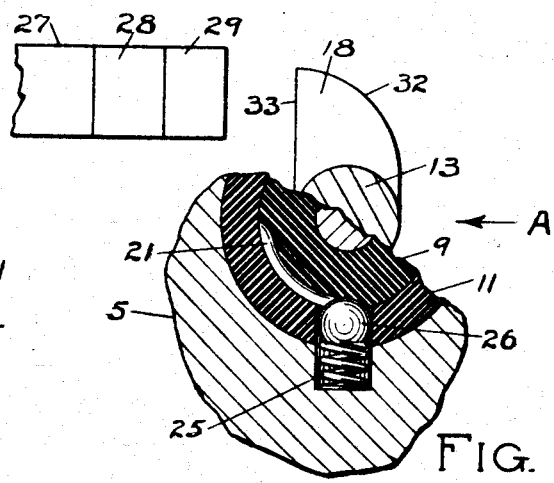
Fig. 4 is a sectional plan view of a portion of a push button on line 4—4 of Fig. 1 and in the position of Fig. 3 ready to move in the direction of arrow A.
Figure 7:
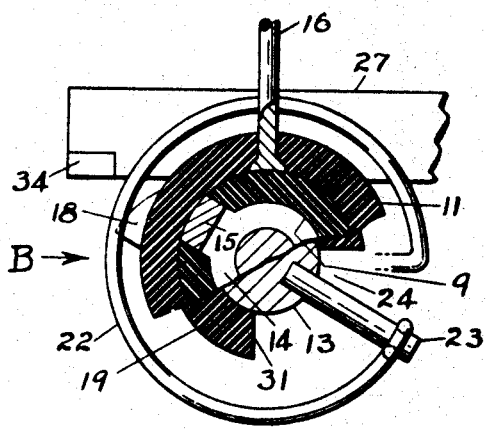
Fig. 7 is the same sectional view of the push button shown in Fig. 6 but with the push button turned as in Fig. 5.

The bottom portion of cup 11 is reduced in diameter at 19 and is bored to form a bearing for the stem 13. 19 is cut away approximately one-quarter of its diameter to leave an open space 24 (Figs. 1, 2, 6, 7) in which the stop pin 23 can travel when button 9 and its stem 13 partially rotate. Pin 23 forms a stop for the stem 13 when it contacts with the vertical surface 31 on one side of the opening 24 (Figs. 2, 6, 7). Spring 22 is fastened at one end to the cup 11 and at the other end to the stop pin 23 for the purpose of bringing said pin 23 against surface 31 when stem 13 is free to rotate, which occurs when foot 18 is not in contact with sector 27. The stem 13 terminates at the bottom into a foot 18 extending at right angles to it (Fig. 1), said foot 18 having one straight side 33 and one curved side 32 as shown in Figs. 4 and 5.

27 is a sector for contacting with the foot 18 of button 9, and is clamped to, and supported by the steering column 1 through its hub 50 and arms 35. A strip of insulating material 36 is between the column 1 and hub 50. Sector 27 is beveled at 28 (Fig. 2) to raise button 9 when the foot 18 of its stem 13 contacts therewith, which occurs when steering wheel 3 is rotated in the direction of arrow A to make a right turn. 29 is insulation on the point of the bevel 28 to prevent electrical connection between foot 18 and sector 27 until button 9 is raised to the point where contact between 17 and strip 15 has momentarily been broken. It will be understood that the use of this insulation 29 can be varied to allow for contact between 18 and 27 at a different position of the button 9, as for instance before contact between wire 17 and strip 15 has been broken.

39 is a plug screwed into insulation 52 in the side of steering column 1 and connects sector 27 through one of its arms 35 and wire 37 with wire 38 to battery 53. Plug 39 being in the steering column 1 maintains a connection with the wire 17 in the rotatable steering wheel 3 and the tube 2 by means of a spring 40 and ball 41, the latter of which is always in contact with the metal strip 42. 42, connected to wire 17, is an endless strip of metal around the tube 2 and insulated from it by means of the insulation 54.

Plug 43 is similar in construction to plug 39 and connects the right turn signal 48 (represented as a hand and a right pointing finger, Fig. 3) with wire 16 through the medium of wires 44 and 47 and the arm 46 of switch 55. Plug 43 is connected to wire 16 by means of an endless metal strip 51 around tube 2 similar to strip 42 for connecting plug 39 and wire 17.

Insulation for wires 16 and 17 in the steering tube 2 is shown as 49, while 45 is the insulation for wires 16 and 17 between said insulation 49 and the insulation cup 11. Connected to wire 16 is a light bulb 30 which is set into the steering wheel arm 5.

Push button 10 in the arm 6 of steering wheel 3 is similar in construction to push button 9 and is set into an insulating cup 12 similar in construction to insulating cup 11 above described. 57 is a spring for the stem 56 of push button 10. 58 is the foot of stem 56. 59 is a sector for contacting with the foot 58 and is fastened to, and supported by the steering column 1 by means of a hub 62 and arms 61. Hub 62 is insulated from the column 1 by insulation 63.

65 and 69 are plugs similar in construction to plugs 39 and 43 and are similarly screwed into insulation in the steering column 1. Plug 65 connects sector 59 through one of its arms 61 and wire 64 with wire 66 to battery 53, and also is connected through strip 60 to wire 68 leading to insulation cup 12 in the same manner as plug 39 is connected to wire 17.

Plug 69 connects left turn signal 73 (represented as a hand and a left pointing finger, Fig. 3) with wire 67 through the medium of wires 70 and 72 and the arm 71 of switch 55. Plug 69 is connected to wire 67 by means of an endless metal strip 78 around tube 2 similar to strip 42 for connecting plug 39 and wire 17.

Right and left turn signals 48 and 73 are preferably electric bulbs mounted in a casing on the right and left thereof respectively, and adapted to illuminate colored hands with a forefinger pointing to right and left respectively. It will be understood that separate casings can be used for the two hands.

The switch 55 is of the ordinary double pole type for disconnecting the signal device when desired so it will not operate.

74 is a light bulb set into arm 6 of the steering wheel 3 and is connected to wire 67 in the same manner as bulb 30 is shown connected to wire 16.

76 is insulation in the beveled end of 77 of sector 59, similarly placed and for the same purpose as described in connection with insulation 29 on beveled end 28. 34 is a piece of insulation on the end of sector 27, opposite its beveled end 28, for the purpose of contacting with the curved side 32 on foot 18 of push button 9, and so preventing the operation of turn signal 48 when the steering wheel 3 is being turned in direction of arrow B. 75 is a piece of insulation on the end of sector 59, opposite its beveled end 77, for the purpose of contacting with the curved side on foot 58 of push button 10 and so preventing the operation of turn signal 73 when the steering wheel 3 is being turned in the direction of arrow A.

In the wiring diagram in Fig. 3, the wires 38 and 66 are shown connected directly to the push buttons 9 and 10 from battery 53, but it will be understood that the detailed manner in which this connection is made is shown in Fig. 1. For instance, the current from the battery 53 goes through wire 38 to plug 39 and then can take either the path of outside wire 37 or inside wire 17 depending on whether the push button 9 is up as in Fig. 1 or down as in Fig. 2, to be explained in the description of the mode of operation.

The mode of operation is as follows:

When the automobile is moving straight ahead, the steering wheel 3 is in the position shown in Fig. 3. If it is desired to signal a right hand turn before making the turn, the push button 9 on the arm 5 of said steering wheel 3 is pushed down (Fig. 2). The strip 15 on button 9 (Fig. 1) then connects the ends of wires 16 and 17 and the current from battery 53 flows through wire 38, plug 39, wire 17, strip 15, wire 16, lighting bulb 30, plug 43, wire 44, arm 46 of switch 55, wire 47, lighting turn signal 48 and completes the circuit through the ground to battery.

When the steering wheel 3 is rotated in direction of arrow A to make the right turn, foot 18 of push button 9 contacts with beveled end 28 of sector 27, raising said push button 9 to the position shown in Fig. 1, where said foot 18 rides on the top of said sector 27 and is held in contact therewith by means of the ball 26 and spring 25. The ball 26 holds the push button 9 down on top of sector 27 with a slight pressure, as said ball is not perfectly seated in the slot 21 but bears on the lower side thereof. When the ball 26 is completely seated in slot 21, as when the push button 9 is in its upper position but free from contact with the top of sector 27, the foot 18 of said push button 9 assumes a position slightly lower than the top of said sector 27, or in a position similar to that of the foot 58 of push button 10 in Fig. 1.

When foot 18 contacts with sector 27, it first rides up on the insulation 29 until the strip 15 breaks contact with the wire 17. Then electrical contact is made with bevel 28 and the current flows from plug 39 to strip 15 through wire 37, arm 35, sector 27, foot 18, stem 13 and plate 14, instead of through wire 17. There is a momentary break in the signal light 48 when this change in the flow of current is made as described, which only serves to attract attention, though a continuous signal could be made by changing the position of the insulation 29.

If the signal was not made manually by pushing the button down before a turn was started, the turning of the steering wheel 3 in the direction of arrow A will automatically light the signal 48 as soon as foot 18 of push button 9 contacts with sector 27. Turning wheel 3 in direction B from direction A and while foot 18 is riding on top of sector 27, said foot 18 will partly rotate and drop off the top of said sector 27 and assume the position shown in Fig. 5, which is also similar to the position of foot 58 of push button 10 in Fig. 1.

Turning steering wheel 3 in direction of arrow B (Fig. 3) until foot 18 of push button 9 contacts with sector 27, the curved side 32 of said foot 18 will first strike insulation 34 and cause foot 18 to assume position shown in Fig. 5 and then slide along the outer edge of said sector 27. The normal free position of foot 18 in relation to sector 27 is shown in Fig. 4 and it is held in that position by spring 22 pressing pin 23 against surface 31, (Fig. 6). Strip 15 is then in contact with wire 16 (Figs. 1 and 6) so the contact of foot 18 with insulation 34 prevents the flow of current to the signal 48 and the rotating of foot 18 to the position in Fig. 5 prevents a closed circuit when said foot 18 slides along sector 27, as the strip 15 and wire 16 are then out of contact as shown in Fig. 7.

Operation of signal 48 can therefore be made manually before coming to a turn, or automatically after the turn is started and the operation of the automatic feature throws off the manual signal and leaves it in a position to be again operated, as well as automatically throwing off the automatic signal on reversal of the steering wheel.

In the same manner the left turn signal is manually or automatically operated and automatically thrown off. If a turn signal has been made by pushing down either of the push buttons and no turn is made, the signal can be thrown off by pushing the button up from the bottom by hand.

Turning of the wheel 3 in the direction of A therefore operates the signal 48 and a continuation of the movement in direction A until foot 58 of push button 10 contacts with sector 59 will not operate signal 73, as said foot 58 will slide along the inside of sector 59 and being partly rotated does not make a closed circuit. Reversing the wheel 3 from direction A to direction B, the signal 73 remains off as foot 58 slides along the inside of sector 59, and if signal 48 is off it remains off as foot 18 slides along the outside of sector 27 when it comes to it, or if said signal 48 is on, it is automatically thrown off by the partial rotation of said foot 18 and the breaking of the contact of strip 15 with wire 16.

In the same manner, turning of the wheel 3 in the direction of B operates signal 73 and reversing the direction to A throws off said signal 73 without operating signal 48.

If the steering wheel 3 is rotated a complete turn or more in say direction A to make a right turn the reversal of wheel 3 to direction B after making turn will operate left turn signal 73 until wheel 3 is straightened to normal position. The length of sectors 27 and 59 can be varied to suit the turning radius of a car.

Having thus described my invention, I claim:

1. A turn signal device comprising two wires; a stationary and a movable contact, said stationary contact consisting of a sector attached to and concentric with the steering column of an automobile and said movable contact consisting of a push button attached to the steering wheel of said automobile; said push button having a side contact strip for first connecting said wires when manually pushed down and a foot for contacting with said sector when said wheel is turned to push said button up to break said first connection and make a second connection of said wires through said sector; said foot operated by said sector on the reversal of said wheel to partially rotate said button and break said second connection.

2. A turn signal device comprising two electric conductors a stationary contact sector attached to the steering column of an automobile; and a movable contact push button attached to the steering wheel of said automobile, said push button having a contact member on the side to connect said conductors when depressed and a side projecting foot on its end to contact with said sector and return said button to approximately its normal position upon the turning of said wheel to connect said conductors through said button and said stationary contact, said conductors disconnected by the partial rotation of said button on the reversal of direction of said steering wheel.

3. A turn signal device comprising a movable contact push button mounted in the steering wheel of an automobile; a stationary contact sector attached to the steering column of said automobile and in the path of said push button; and two electric conductors; said push button having a side projecting foot on its end to contact with and ride upon said sector to connect said conductors when said steering wheel is operated in making a turn, said foot partially rotating said push button to disconnect said conductors when said foot is riding upon said sector and said steering wheel is reversed.

4. A turn signal device for an automobile having a steering wheel comprising two electric conductors; a stationary sector and a push button to make and break connection between said conductors; said push button mounted on said steering wheel and said stationary sector attached to the steering column of said automobile in the path of said push button; said push button manually operated to connect said conductors through one portion of said button before the turning of said wheel and having a side projecting foot to contact with said sector to return said push button to its approximate normal position and connect said conductors through another portion of said button upon the turning of said wheel and to partially rotate said button and disconnect said conductors upon the reversal of said steering wheel.

5. A turn signal device comprising a movable contact push button mounted in the steering wheel of an automobile; a stationary contact sector attached to the steering column of said automobile and in the path of said push button; two electric conductors; said push button having a side projecting foot on its lower end to contact with and ride upon said sector to connect said conductors when said steering wheel is operated in making a turn; insulation on the beveled front end of said stationary sector to contact with the foot of said push button before connecting said conductors; and insulation on the rear end of said stationary sector to contact with said foot and partially rotate said push button to prevent connecting said conductors when said foot has passed said sector and upon the reversal of said steering wheel.

6. A turn signal device comprising right and left turn electric conductors; a right and a left turn movable push button mounted in the steering wheel of an automobile; a right and a left turn stationary contact sector attached to the steering column of said automobile and in the respective paths of said right and left turn push buttons; said right and left turn push buttons each having a side projecting foot to contact with its corresponding right or left turn sector to connect the right or left turn conductors corresponding to the right or left turning of said steering wheel, and partially rotating said left or right push button by means of its foot and its corresponding sector to prevent connecting the respective left or right conductors opposite to the movement of said steering wheel.

ROBERT MARSH.